United States Patent [19]
Kaneko et al.

[11] Patent Number: 5,414,445
[45] Date of Patent: May 9, 1995

[54] ERGONOMIC POINTING DEVICE

[75] Inventors: Steven T. Kaneko; Aditha M. Adams, both of Seattle, Wash.

[73] Assignee: Microsoft Corporation, Redmond, Wash.

[21] Appl. No.: 957,682

[22] Filed: Oct. 7, 1992

[51] Int. Cl.6 .............................................. G09G 3/02
[52] U.S. Cl. .................................... 345/163; 345/164
[58] Field of Search ............................... 345/164–166, 345/163; D14/107, 114

[56] References Cited

U.S. PATENT DOCUMENTS

| | | | |
|---|---|---|---|
| D. 288,930 | 3/1987 | Barbera et al. | D14/100 |
| D. 291,318 | 8/1987 | Kim | D14/114 |
| D. 302,426 | 7/1989 | Bradley et al. | D14/114 |
| 3,835,464 | 9/1974 | Rider | 345/164 |
| 4,559,532 | 12/1982 | Hosogoe | 340/710 |
| 4,562,314 | 12/1985 | Hosogoe et al. | 200/5 R |
| 4,613,853 | 9/1986 | Hosogoe et al. | 345/164 |
| 4,754,268 | 6/1988 | Mori | 340/710 |
| 4,786,892 | 11/1988 | Kubo et al. | 345/164 X |
| 4,806,917 | 2/1989 | Hosogoe | 345/164 |
| 4,862,165 | 8/1989 | Gart . | |
| 5,252,970 | 10/1993 | Baronowsky | 345/164 X |

FOREIGN PATENT DOCUMENTS

| | | | |
|---|---|---|---|
| 0348153 | 12/1989 | European Pat. Off. | G06K 11/06 |
| 0453587A1 | 10/1991 | European Pat. Off. | G06K 11/18 |

OTHER PUBLICATIONS

SICOS Colani Mouse by Sicos Computer–Zugehor, Promotional Material, 1992.
Lewis, "Building a Better Mouse," *San Jose Merc. News*, Feb. 3: 1991.
Tessler, "Input Alternatives," *Macworld*, Jun.: 154–159, 1992.
Gruman, "What Price Mice," *Infoworld*, Apr. 23: 63–69, 1990.
Gruman & Needleman, "Graphical Interfaces Spur the Development of Alternative Input Devices," *Infoworld*, Apr. 23: 72. 1990.
Lusty & Spector, "Keyboards, Mice, and Trackballs With the Personal Touch," *PC World*, Jun.: 166–170, 1990.
Yacco, "New Alternative Mac Pointers: Pointing to the Future?," *Computer Shopper*, Dec.: 568–574, 1990.
Bermant, "The Mouse that Roared," *Personal Workstation*, Jun.: 71–72, 1991.
Zelnick, "Alternate Input Mice and Trackballs," *PC Magazine*, Aug.: 212–213, 220–222, 1990.
Rice, "Mice vs. Trackballs: The Anatomy of a Choice," *PC Magazine*, Aug.: 216–217, 1990.
Sullivan, "Mice Find their Niche in Graphical Environments," *PC Week*, Sep. 9: 105–106, 1991.
"Makers Offer a Diverse Range of Mice," *Computer Products*, Oct.: 176–242, 1990.
Logitech Series/2 Mouse by Logitech, Inc., Promotional Material, 1988.
PC Mouse by MSC Technologies, Inc.
HiRez Mouse by Logitech, Inc.
GVC LiteMouse (Model OM-A1) by GVC Corporation.
Omnimouse by MSC Technologies, Inc.
Hodes & Akagi, "Study, Development, and Design of a Mouse," *Proceedings of the Human Factors Society 30th Annual Meeting*, 900–904, 1986.

(List continued on next page.)

*Primary Examiner*—Ulysses Weldon
*Attorney, Agent, or Firm*—Seed & Berry

[57] ABSTRACT

An ergonomic pointing device is disclosed and described. Specific criteria, for example height, length, curvature, and relative positions of device elements, such as keys and a high point, define a configuration of a preferred embodiment of the present invention. These criteria work together to provide an ergonomic pointing device which supports a user's hand plane while allowing the hand to rest in a biomechanically neutral position, while maintaining the accuracy with which the pointing device may be controlled and actuated.

32 Claims, 6 Drawing Sheets

OTHER PUBLICATIONS

Lewis & Alfonso, "Developing the IBM Personal System/2 Mouse: An Industrial Design/Human Factors Collaboration," *Proceedings of Interface 89*, 263–267, 1989.

Hodes, "Research and Design of a Mouse," *Proceedings of Interface 87*, 321–326, 1987.

Krause, ed., "The Best of Category—Office and Telecommunication Technology," *Industire Forum Design Hannover*, 46–51, 1991.

Mack & Montaniz, "Comparison of Touch and Mouse Interaction Techniques for a Graphical Windowing Software Environment," *Proceedings of the Human Factors Society 35th Annual Meeting*, 286–289, 1991.

Mahach, "Comparison of Computer Input Devices: Linus Pen, Mouse, Cursor Keys and Keyboard," *Proceedings of the Human Factors Society 33rd Annual Meeting*, 330–333, 1989.

Verplank & Oliver, "Microsoft Mouse: Testing for Redesign," *Proceedings of the Interface*, 257–261, 1989.

KM Mouse for Windows, MS-300.

ERGONOMIC POINTING DEVICE

TECHNICAL FIELD

This invention relates to pointing devices for entering commands into a computer, and more particularly, to an ergonomically designed pointing device.

BACKGROUND OF THE INVENTION

Pointing devices for entering commands into a computer are well known in the art. Some pointing devices include a rotatable ball and one or more depressible keys, sometimes referred to as buttons. Electronic encoders sense rotation of the ball, and generate a signal indicative of the ball's rotation to control movement of a cursor on a screen of the computer. Depressing one of the keys permits a user to enter various commands into the computer, based on the location of the cursor. For example, depressing the key may highlight text in a word processing program, pull down a menu, open and close files, and the like.

In a mouse-type pointing device, the rotatable ball extends from a bottom surface of the pointing device, for contacting a work surface, such as a table top. The movement of the pointing device across a work surface causes rotation of the ball and the desired movement of the cursor on the screen.

Many of the currently available pointing devices have disadvantages, however, in that they are uncomfortable or difficult to use, especially for relatively long periods. This may manifest itself in several ways, for example, the hand or arm of a user may feel tired after grasping and operating the pointing device for any length of time.

A need therefore exists for a pointing device that is more comfortable and easy to use, that will minimize any fatigue experienced by a user.

SUMMARY OF THE INVENTION

It is, therefore, an object of this invention to provide a pointing device that is easier and more comfortable to use than existing pointing devices.

It is another object of this invention to provide a pointing device that will minimize any fatigue experienced by a user.

These and other objects of the invention, as will be apparent herein, are accomplished by providing an improved pointing device having an ergonomic design. A preferred embodiment is relatively long and has a top surface which slopes upward from a front end to a high point, and slopes downward from the high point to a back end and to its sides. In addition to the overall length and distance of the high point from a bottom surface of the pointing device, aspects of the preferred embodiment include: (1) the position of the high point relative to the front end of the pointing device, where one or more keys are located; (2) a relatively low back height of the pointing device; (3) a minimal slope from the back end of the device to the high point; (4) a sizing of the keys and sides of the pointing device, to ensure adequate contact surfaces for a user's fingers; (5) a relatively narrow width of the front of the pointing device to allow accurate control; (6) a sufficient width across an arc of the pointing device to support the weight of a user's hand; (7) a center of a rotatable ball located near a grip axis to provide a feeling of control and responsiveness; and (8) a rounded edge to minimize contact between a user's hand and sharp edges.

All of the design features noted above work together to provide physical and visual cues for a user to grasp the pointing device in a neutral manner, and to support the weight of a user's hand. The curvature of the top surface and the low back end allow users to position their lower palm on a work surface, such that their hand plane is supported by the pointing device, and to rest their fingers in a neutral posture to control the keys without having to compress or reach. The above design features further encourage different users to grasp the pointing device in different ways, while still providing a feeling of accurate control and responsiveness.

DETAILED DESCRIPTION OF THE INVENTION

In order to more fully understand the present invention, it is helpful to define background concepts and terminology. In accordance with the present invention, it is believed that the majority of existing pointing devices may be difficult and uncomfortable to use, because they are too short to provide adequate support for a user's wrist and hand, thereby resulting in static loads on the forearm muscles of a user. A relatively short length also encourages a user to operate the keys of the pointing device with contracted fingers, which also serves to place additional stress on the tendons of the user's hand. These loads and stresses may cause a user to experience fatigue or discomfort.

Furthermore, some pointing devices have a relatively high back end. It is believed that this encourages a user to operate the mouse with a wrist in a raised position, which places stress on the user's upper arm and shoulder area. In addition, it is believed that the user is encouraged to control the pointing device with the larger muscle groups of the arm, which, given current mouse designs, results in a loss of accuracy in moving and actuating the pointing device.

It is further believed that the overall shape and configuration of existing pointing devices provides visual cues and encourages all users, regardless of their hand size, to grasp the pointing device in the same manner, or "grip architecture." This is a shortcoming of existing products. Every user is different in physical size and physical proportions. As a result, the optimum operating position, defined as operation within a biomechanically neutral zone, will be different for different users.

The preferred embodiment illustrated herein provides a pointing device that will accommodate a wide range of users, allowing them to grasp and use the pointing device in an ergonomically natural manner, thereby increasing the ease and comfort with which the pointing device may be used.

Figure 1:
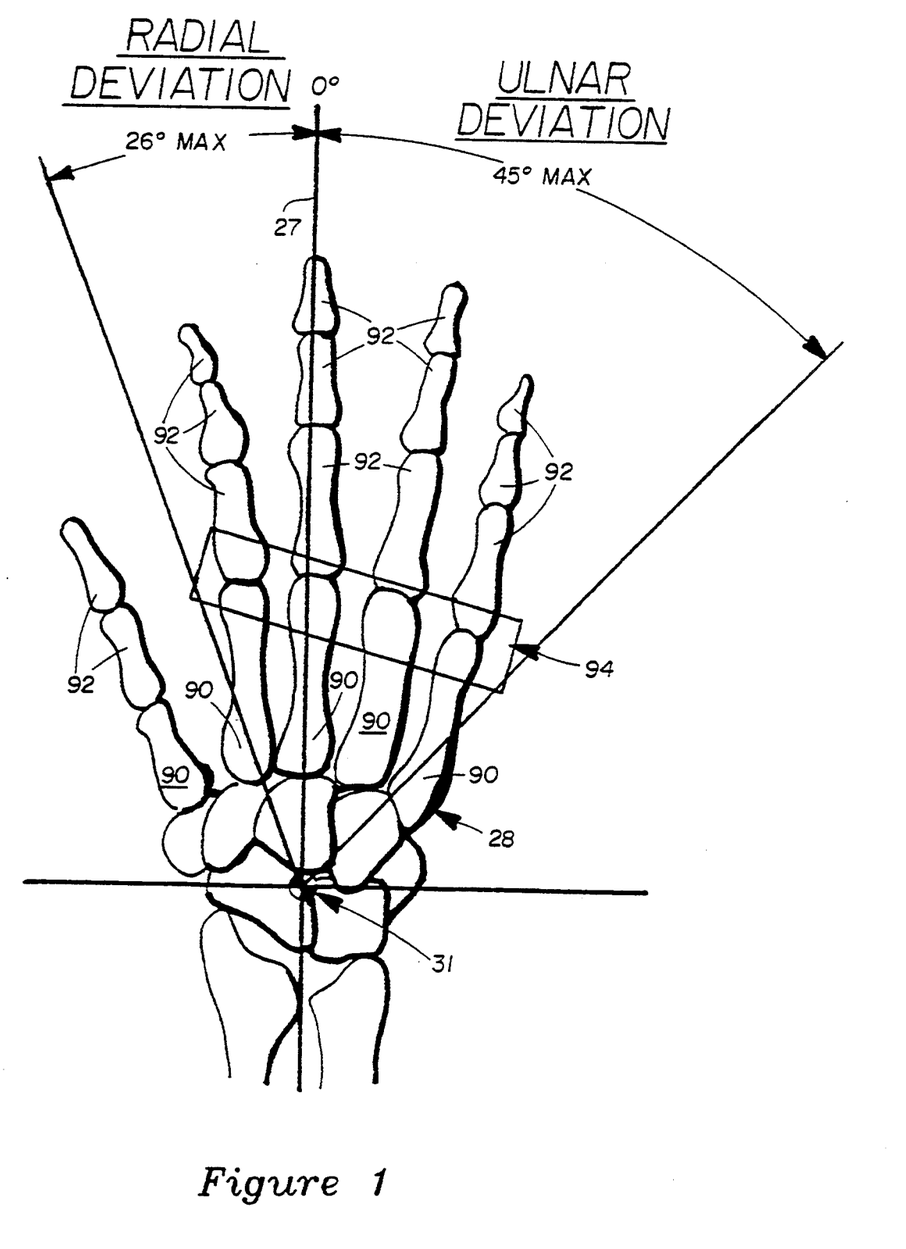
FIG. 1 is a skeletal diagram of a user's right hand.
Figure 2:
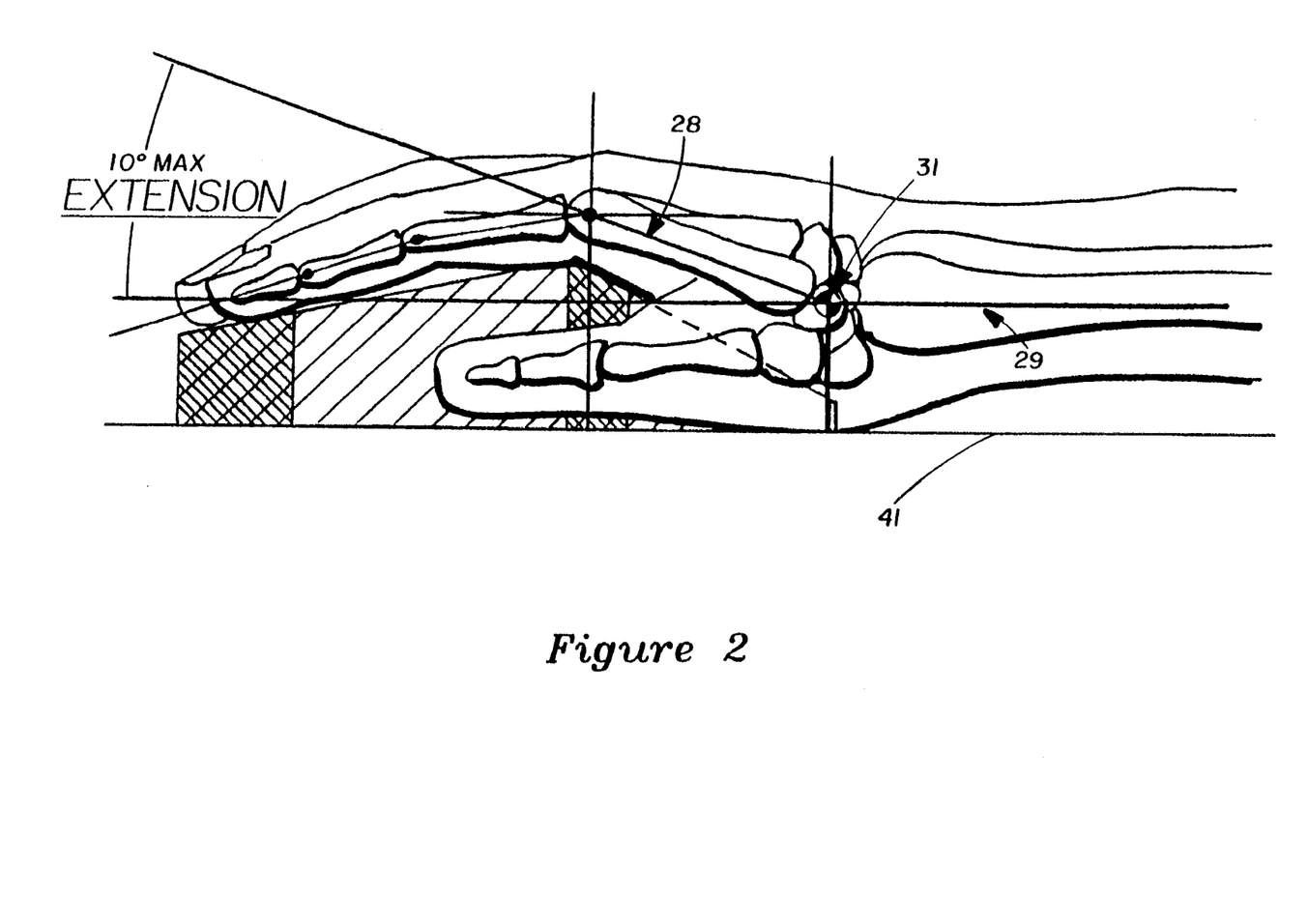
FIG. 2 is a diagram of a user's hand resting on a preferred embodiment of the present invention in a biomechanically neutral position.

These benefits are achieved in the preferred embodiment by quantifying and incorporating ergonomic criteria for each point of contact between a user and the pointing device, such that the user may grasp and use the pointing device in a biomechanically neutral position. Such a neutral position is achieved when the flexors and extensors of the user's hand and wrist are in equilibrium and static loads on forearm muscles and other large muscle groups are minimized. A biomechanically neutral zone specific to the wrist is achieved, if, while controlling the pointing device, it does not exceed a maximum extension of 10 degrees, a maximum radial deviation of 26 degrees, and a maximum ulnar deviation of 45 degrees. As illustrated in FIG. 1, when a hand is on a flat surface radial deviation is rotation toward the thumb and ulnar deviation is rotation toward the "little finger." Both deviations are measured relative to a vertical axis 27 passing through the center of a wrist joint 31. As illustrated in FIG. 2, extension is measured as the acute angle created by an inclination of hand plane 28, as described below, relative to a horizontal axis 29 passing through the center of the wrist joint 31.

As further illustrated in FIG. 1, the five major hand bones radiating from the wrist area are metacarpals 90, and the finger bones, totaling 14 in each hand, are called phalanges 92. The metacarpal-phalangeal joint ridge 94 is a critical area of a hand when operating a pointing device and should be the primary location of contact with the pointing device to support the weight of the hand. As further illustrated in FIG. 1, a hand plane 28 is defined by the second to fifth metacarpals 90, the metacarpals being numbered 1 through 5, beginning with the thumb. It is believed that providing this support for a user's hand plane will reduce the loads on a user's large muscle groups and shoulder.

The ranges and specific dimensions for the preferred embodiment described herein were arrived at through the use of anthropometric data, biomechanics and observation-based methodology. Given that many of the edges and surfaces of the preferred embodiment are curved, it will be appreciated by one of ordinary skill in the art that measurements taken from or to a curved edge are accurate within a range of ±0.02 inches, and it will be appreciated by those in the art that minor deviations from the stated ranges or dimensions will not depart from the spirit of the present invention.

It is believed that the preferred embodiment of the invention described herein provides an ergonomic pointing device that will accommodate North American adult users falling within an ergonomically defined range, from a 5th percentile female to a 95th percentile male. The range is based on hand size, a larger percentage being assigned to a larger hand, and vice versa. This means that the ergonomic pointing device described herein is believed to accommodate a group of users ranging from a woman in the 5th percentile, having a relatively small hand, to a man in the 95th percentile, having a relatively large hand. It will be appreciated that users falling outside this design range may still enjoy advantages from the preferred embodiment and that alternate preferred embodiments can be developed for other target user groups (e.g., males with hand sizes above the 95th percentile) in accordance with the present invention.

As discussed previously, and as illustrated in FIGS. 2, 3 and 7, a pointing device 20 for inputting commands into a computer (not shown) is provided with means for communicating with the computer. This means typically includes a rotatable ball 82 extending from a bottom surface 42 to contact a work surface 41. As a user grasps and moves the pointing device 20 across the work surface 41, the ball 82 rotates, moving a cursor on a computer screen (not shown). The user may enter commands into the computer corresponding to the location of the cursor by depressing one or more keys 26 provided on the pointing device 20.

Given that different people have different sized hands, it is preferred to provide a pointing device that will allow a wide range of people, as discussed above, to grasp and use the pointing device 20 in a biomechanically neutral position.

Figure 3:
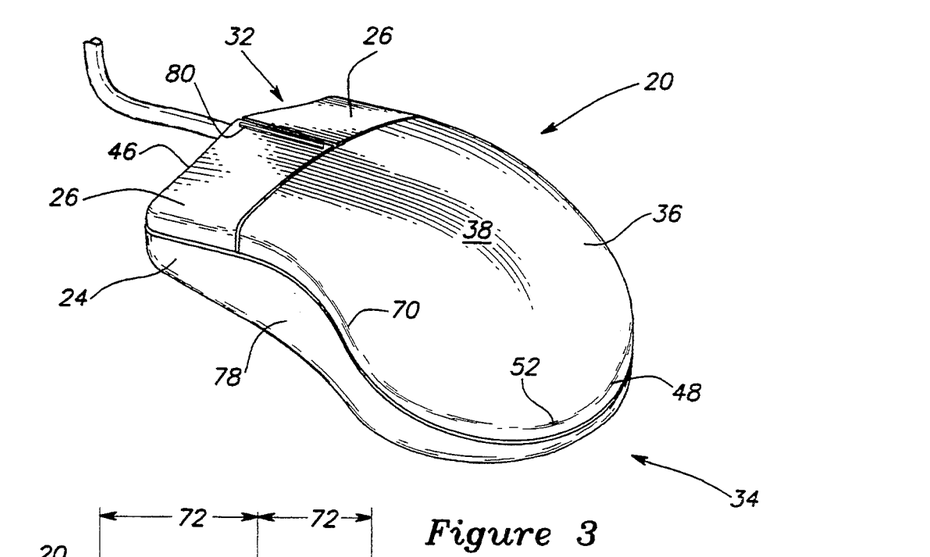
FIG. 3 is a rear isometric view of an ergonomic pointing device.
Figure 6:
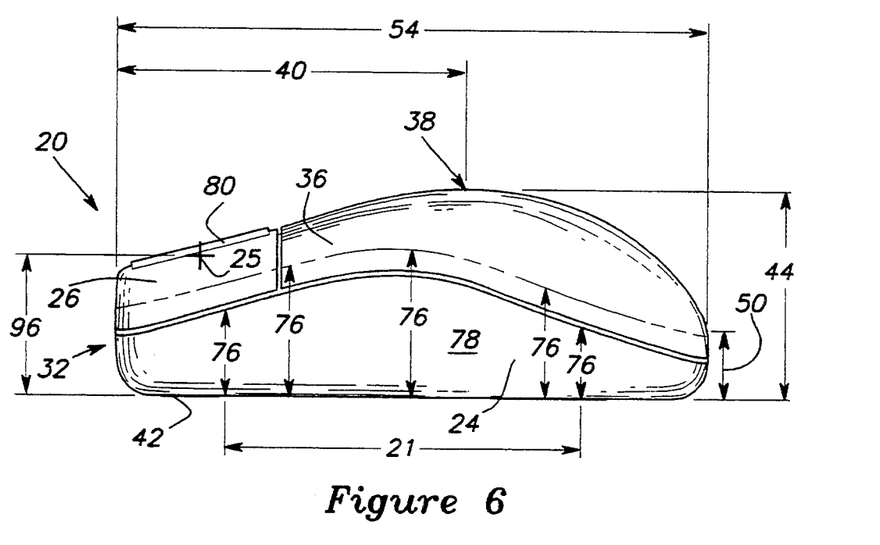
FIG. 6 is a left side elevational view of the pointing device of FIG. 3.

This goal is achieved in the preferred embodiment illustrated in FIGS. 3-7 by providing a pointing device 20 having a body, or housing, 24, a portion of which comprises keys 26. As best seen in FIG. 3, the body 24 has a front end 32, a back end 34, and a top surface 36. The top surface 36, as seen in FIGS. 3 and 6, slopes upward from the front end 32 to a high point 38, and slopes downward from the high point 38 to the back end 34. The pointing device 20 further has two sides 78 which extend from the top surface 36 to the bottom surface 42. The top surface 36 further slopes from the high point 38 toward the sides 78, to provide a curved, sloped surface having a bulge, or high point 38. An edge 70 defined by the perimeter of the top surface 36 is curved to minimize contact between a user and sharp edges, a portion of the edge 70 forming a front edge 46 where the front end 32 and top surface 36 meet, another portion of the edge 70 forming a back edge 48 where the back end 34 and the top surface 36 meet.

Additional features of the preferred embodiment described herein include a length 54 of the pointing device 20, a height 50 of the back end 34, a distance 44 from the high point 38 to the bottom surface 42, a distance 40 from the high point 38 to the front end 32 and the width of the pointing device 20.

Taking each of these features in turn, the length 54 of the pointing device 20 is measured along the bottom surface 42 from a most forward point to a most rearward point, and is believed to contribute to preferred results if it is 4.25 inches to 4.5 inches. In a preferred embodiment, it is believed that optimum results are achieved when the length 54 is 4.5 inches.

The height 50 of the back end 34 is measured between a most rearward point 52 of the back edge 48 and the bottom surface 42. It is believed that preferred results are achieved when this distance is 0.0 inch to 0.5 inch. In the preferred embodiment illustrated herein, the height 50 is 0.5 inch.

As illustrated-in FIG. 6, the distance 44 from the high point 38 to the bottom surface 42 is measured along a line perpendicular to the bottom surface 42 and contributes to preferred results when this distance is 1.5 to 1.6 inches. In a preferred embodiment, it is believed that optimum results are achieved when the distance 44 is 1,587 inches. The distance 40 from the high point 38 to the front end 32 contributes to preferred results when this distance ranges from 2.65 to 2.75 inches, and is believed to provide optimum results when it is 2.75 inches.

Figure 8:
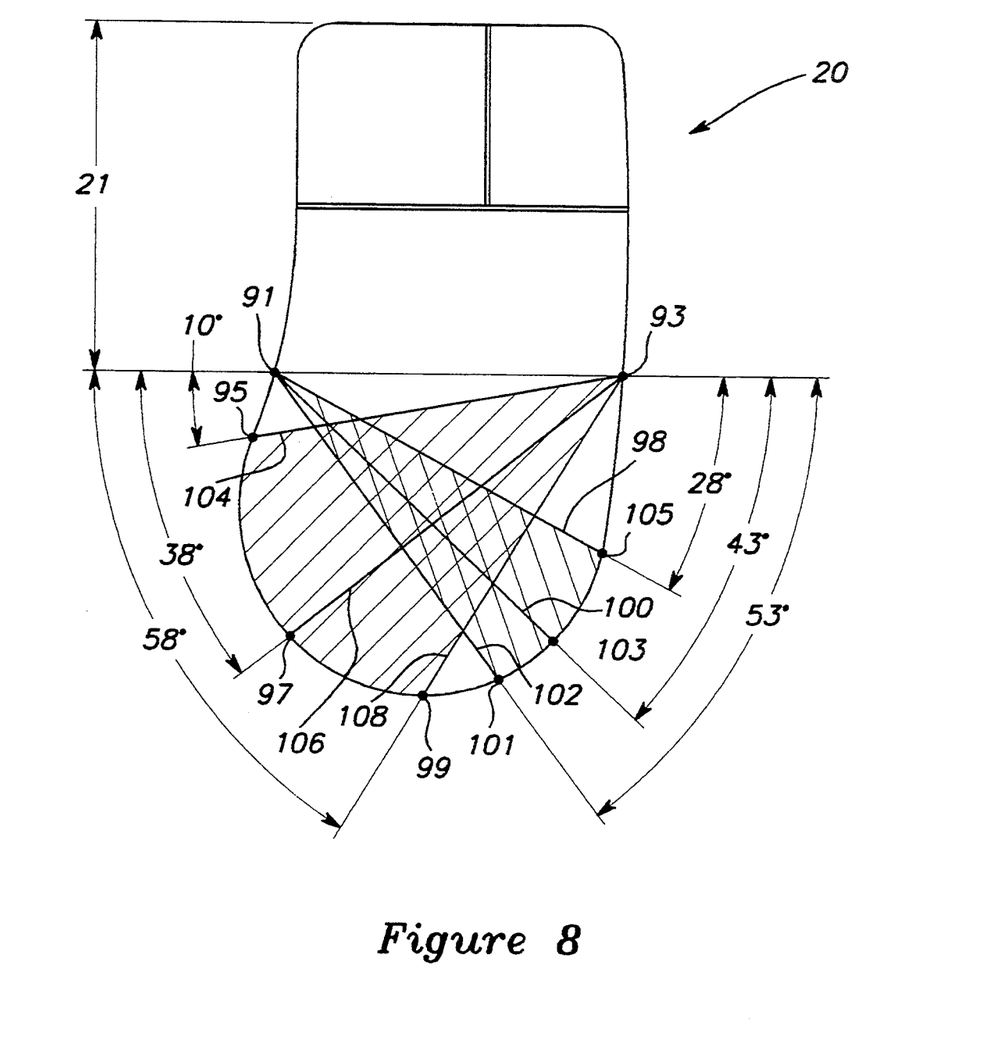
FIG. 8 is a top plan view of the pointing device of FIG. 3 illustrating areas of typical hand placement by a user.

As illustrated in FIG. 8, a width of the pointing device is measured along an arc of the top surface 36, examples being shown by the arcs in FIG. 8 marked by reference numerals 98, 100, 102, 104, 106, and 108. These arcs correspond to the placement of a user's metacarpal-phalangeal joint ridge 94. For placement of a left hand of a user, the arc, or width, is measured from point 91 to any point along the back edge 48, for example, points 101, 103 and 105. The arc 100 measured along the top surface 36 between points 91 and 103 corresponds to a typical placement of a metacarpal-phalangeal joint ridge 94 of a left hand of a user.

Similarly, the arcs, or widths, corresponding to the placement of a right hand of a user are measured from point 93 to a point on the back edge 48, for example, points 95, 97, and 99. The arc represented by line 106 is measured along the top surface 36 between points 93 and 97, and corresponds to a typical placement of a metacarpal-phalangeal joint ridge 94 of a right hand of a user.

In order to provide full support for the joint ridge 94 of the user's hand, the width measured along an arc should be at least 2.7 inches. The cross-hatched region of FIG. 8 represents an area of the top surface 36 which meets this criteria for the width of the pointing device 20. As is illustrated by FIG. 8, either a left-handed or right-handed person may grip the pointing device 20 in a variety of ways and still receive full support for the metacarpal-phalangeal joint ridge 94. In the preferred embodiment illustrated herein, the width of the pointing device 20 as illustrated ranges from 2.7 to 3.8 inches. In addition, points 91 and 93 are on a line parallel to and rearward of the front edge 46, by a distance noted by reference numeral 21. In a preferred embodiment, the distance 21 is 2.3 to 2.4 inches.

Figure 4:
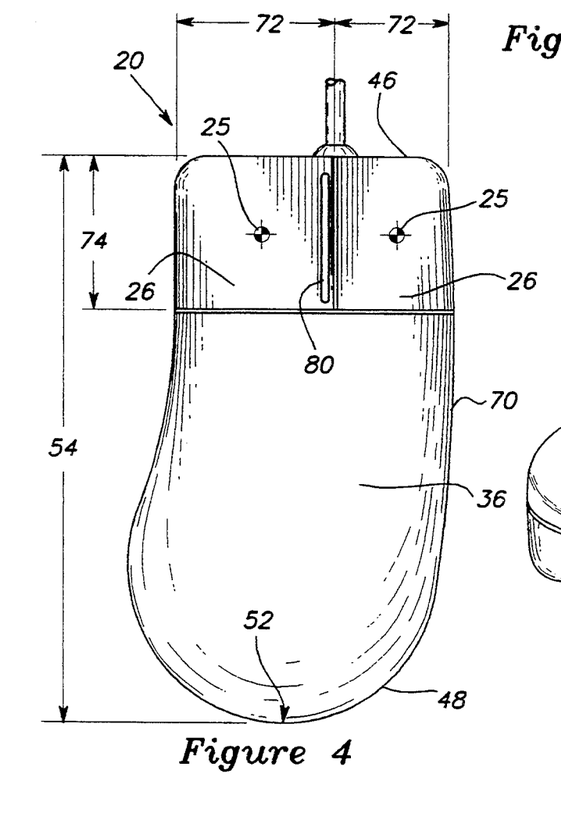
FIG. 4 is a top plan view of the pointing device of FIG. 3.
Figure 5:
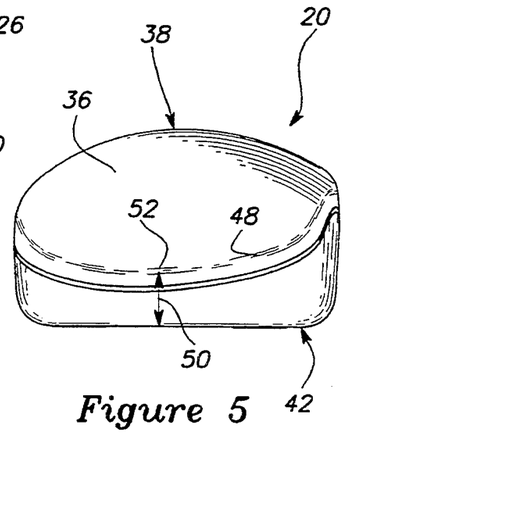
FIG. 5 is a rear elevational view of the pointing device of FIG. 3.

Another aspect of the preferred embodiment described herein, as illustrated in FIG. 4, is the size of the keys 26, which have a minimum width 72 of 0.7 inch and a length 74 of 1 inch. In a preferred embodiment, the two keys 26 are 1.25 inches long, and 1.0 inch and 1.25 inches wide, respectively. One of the keys 26 is larger than the other and is provided with a ridge 80 to create a distinctive tactile feel, thereby allowing a user to distinguish between the two keys 26 without having to look at the pointing device 20. In a preferred embodiment, the ridge is made of a resilient material, for example, rubber.

As illustrated in FIG. 6, the distance 96 from a point 25 located approximately at the center of the key 26 to the bottom surface 42 is 1.0 to 1.1 inches, to further encourage the user's fingers to rest in a neutral posture.

The preferred embodiment 20 described herein further has a minimum height 76 of 0.9 inch, measured between the top surface 36 and the bottom surface 42 along the sides 78 of the pointing device 20 in a region 21 from 0.8 inch rearward of the front end 32 to at least 3.5 inches rearward of the front end 32. This minimum height 76 will ensure that a thumb of a user in the group identified above will be fully supported by the side 78 of the pointing device 20, even when the pointing device 20 is gripped in different ways.

All of the above features work together to provide an ergonomic pointing device that will accommodate a wide range of users, allowing them to grasp and use the pointing device in a neutral, comfortable position. The relatively low height 50 of the back end 34 and the gentle slope upward to the high point 38 provide a visual cue to users to position their lower palm on the work surface and grasp the pointing device 20 in such a manner that the bulge created by the high point 38 and surrounding curvature supports the metacarpal-phalangeal joint ridge. When a user grasps the pointing device in such a manner, the thumb is fully supported along the side 78 of the pointing device 20, and the fingers are allowed to rest in a neutral posture yet be in an appropriate position relative to the length of the pointing device 20, to activate the keys 26. As illustrated in FIG. 2, a neutral posture for the fingers is achieved when they are slightly curved, or bent, relative to a longitudinal axis.

By rounding the edge 70, a user is encouraged and allowed to grasp the pointing device 20 in a variety of ways, thereby increasing the likelihood that the user will grasp and operate the pointing device 20 in a neutral position. By supporting the weight of the hand and allowing of the fingers to rest in a neutral posture, while preventing the wrist from exceeding acceptable ranges for extension and radial and ulnar deviation, the ergonomic pointing device embodying the present invention minimizes stress on the tendons of a user's hand and static loads on the forearm muscles and other large muscle groups in the upper arm and shoulder of a user.

Figure 7:
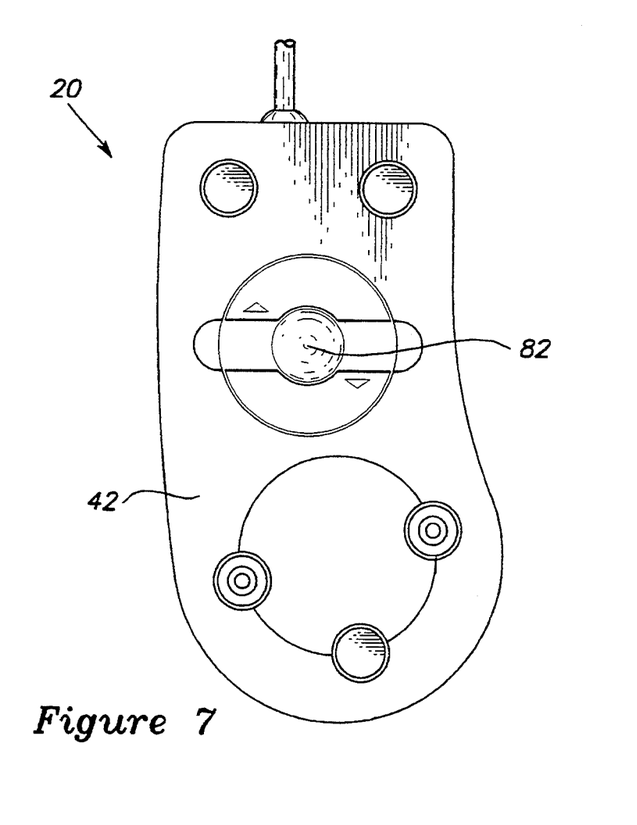
FIG. 7 is a bottom plan view of the pointing device of FIG. 3.
Figure 9:
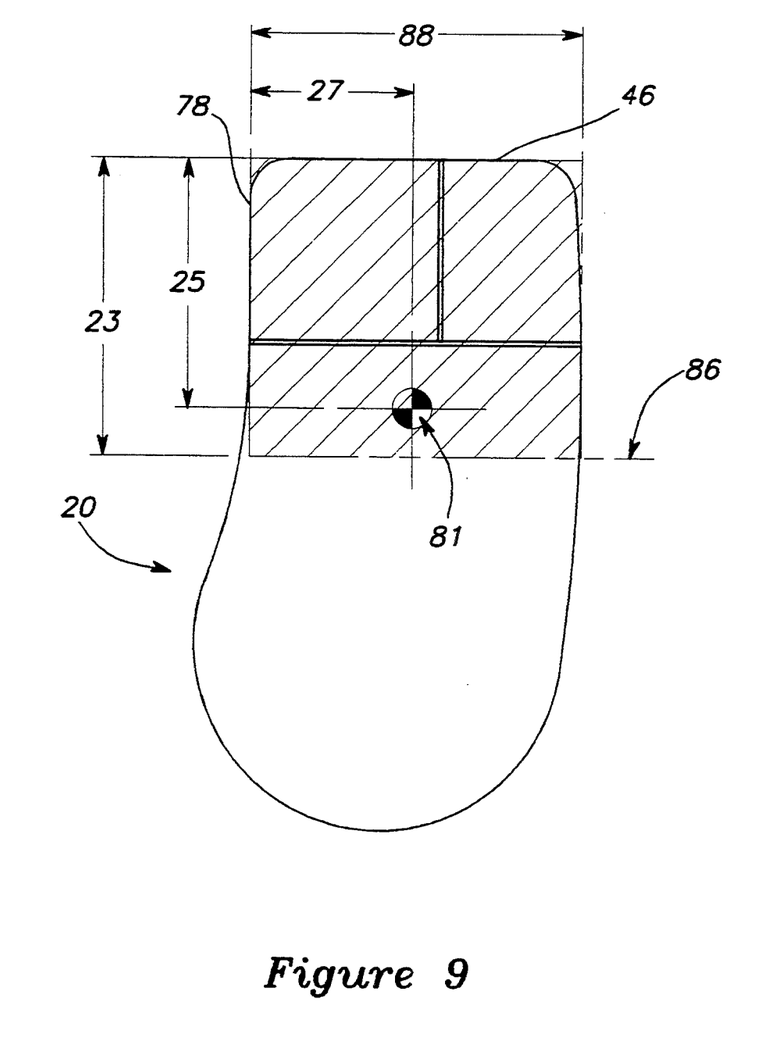
FIG. 9 is a top plan view of the pointing device of FIG. 3 illustrating the relative position of a rotatable ball and a grip axis.

The preferred embodiment illustrated herein provides a pointing device that increases the comfort and minimizes the fatigue associated with its use, without forfeiting accuracy. As illustrated in FIGS. 7 and 9, the rotatable ball 82 is located in the bottom surface 42 near the front end 32 of the pointing device 20.

In a preferred embodiment, a center 81 of the ball 82 is located rearward of the front edge 46 by a distance 25 and is substantially centered relative to a lateral pinch width 88, the center 81 being located from the left side 78 of the pointing device 20 by a distance 27. In a preferred embodiment, the distance 25 is 1.675 inches and the distance 27 is 1.10 inches.

A typical grip axis 86 is believed to be located rearward of the front edge 46 by a distance 23. In a preferred embodiment, it is believed the distance 23 is 1.75 to 2.0 inches. As illustrated in FIG. 9, the center 81 of the ball 82 is therefore near the grip axis 86. By placing the center of the ball 81 near the typical grip axis 86, the user is provided with a sense of control and responsiveness. Also, given that the ball 82 is relatively heavy as compared to the other components of the pointing device 20, the center of gravity of the pointing device 20 will be directed toward the center 81 of the ball 82, further providing a sense of control. Furthermore, the lateral pinch width 88, measured along the bottom surface 42 near the front end 32 between the two sides 78, is minimized, thereby further allowing a user to grasp the pointing device in a relaxed, lateral pinch grip architecture whereby the user may move the pointing device 20 with precision. A preferred range for this width 88 is 2.15 to 2.25 inches, and in the preferred embodiment illustrated herein, the width 88 is 2.25 inches.

An ergonomic pointing device has been shown and described. From the foregoing, it will be appreciated that, although embodiments of the invention have been described herein for purposes of illustration, various modifications may be made without deviating from the spirit and scope of the invention. For example, although all features of the preferred embodiment described herein are believed to contribute to the improved ergonomic results of the present invention, modification or omission of an individual feature or features may be made and still gain benefits of the present invention.

We claim:

1. A pointing device for inputting commands into a computer comprising:

a body;

a key coupled to the body; and wherein the body is 4.25 to 4.5 inches long as measured along a bottom surface from a front end to a back end, the key being coupled to the body such that it forms a portion of the front end and of a top surface, the top surface sloping upwards from the front end to a high point, the top surface sloping downwards from the high point to the back end, the high point being 2.65 to 2.75 inches from the front end and a height of the back end being 0.0 to 0.5 inch, as measured from a back edge to the bottom surface, whereby the height of the back end allows a user to position a lower palm of the user's right hand or left hand on a work surface, a size of the user's right hand or left hand falling within a range of a 5th percentile female to a 95th percentile male of North American adults, and the top surface of the pointing device provides a support for the hand plane of the user's right hand or left hand, the hand plane being a region defined by the second to fifth metacarpals, the metacarpals being numbered 1-5, beginning with the thumb, and allows a finger of the user's right hand or left hand to rest in a neutral posture along the top surface of the pointing device such that the keys may be activated by the finger of the user, thereby allowing the user to grasp and actuate the pointing device with either the right hand or the left hand in a biomechanically neutral position.

2. The pointing device according to claim 1 wherein the length is 4.5 inches, the distance from the high point to the front end is 2.75 inches and the height of the back end is 0.5 inch.

3. The pointing device according to claim 1 wherein the high point is 1.5 to 1.6 inches from the bottom surface as measured along a line perpendicular to the bottom surface and wherein the top surface slopes gradually upward from the back end to the high point such that the pointing device supports the weight of the hand of the user when it is placed on the pointing device, while allowing the hand to remain in a neutral position.

4. The pointing device according to claim 3 wherein the distance between the high point and the bottom surface measured along a line perpendicular to the bottom surface is 1.587 inches.

5. The pointing device according to claim 1 wherein an area of the user's hand that should ideally be in primary contact with the pointing device is a metacarpal-phalangeal joint ridge and a width of the pointing device, measured along an arc of the top surface corresponding to a typical placement of the metacarpal-phalangeal joint ridge is at least 2.7 inches, so as to support the weight of the user's hand.

6. The pointing device according to claim 5 wherein the width of the pointing device is 2.7 to 3.8 inches.

7. The pointing device according to claim 1 wherein an edge, defined by the perimeter of the top surface, is rounded to eliminate contact between the user's hand and a sharp edge, thereby allowing the user to grasp the pointing device in a variety of ways.

8. The pointing device according to claim 1 wherein a width of the key is at least 0.7 inch, a length of the key is at least 1.0 inch, and a distance from a point located substantially at a center of the key is 1.0 to 1.1 inches from the bottom surface such that the user can reach and activate the key with an index finger while maintaining the fingers in a neutral posture.

9. The pointing device according to claim 8 wherein the length of the key is 1.25 inches.

10. The pointing device according to claim 8 wherein the key is provided with a raised element made of a resilient material to allow the user to know the key is being touched without having to look at the pointing device.

11. The pointing device according to claim 10 wherein the key is provided with a ridge made of a resilient material.

12. The pointing device according to claim 1 wherein a height of the pointing device is at least 0.9 inch in a region along a side of the pointing device such that a thumb of a user may rest in a fully supported position against the side of the pointing device.

13. The pointing device according to claim 12 wherein the region of the side in which the height of the pointing device is at least 0.9 inch ranges from 0.8 inch rearward of the front end to at least 3.5 inches rearward of the front end.

14. A pointing device provided with means for communicating with a computer comprising:

a housing having a front end, a top surface which slopes upward from the front end to a high point and which slopes downward from the high point to a back end, a side which extends from the top surface to a bottom surface, and an edge defined by a perimeter of the top surface, a portion of the edge forming a front edge where the front end and top surface meet and a portion of the edge forming a rear edge where the top surface and back end meet;

wherein a portion of the top surface at the front end of the housing comprises a key;

a length of the housing measured along the bottom surface is 4.25 to 4.5 inches;

the high point is 1.5 to 1.6 inches from the bottom surface as measured along a line perpendicular to the bottom surface;

the high point is 2.65 to 2.75 inches from the front edge;

the height of the back end is 0.0 to 0.5 inch as measured from a center point of the back edge to the bottom surface:

the sides of the housing are at least 0.9 inch high as measured from the top surface to the bottom surface in a region from 0.8 inch rearward of the front end to at least 3.5 inches rearward of the front end:

the edge is curved thereby minimizing user contact with sharp edges:

the top surface slopes gradually downward from the high point to the center point of the back end;

the keys are at least 0.7 inch wide and 1.0 inch long;

a width of the pointing device measured along an arc of the top surface corresponding to a typical placement of a metacarpal-phalangeal joint ridge of a user is 2.7 to 3.8 inches;

a lateral pinch width of the housing measured along the bottom surface near the front end perpendicular to the two sides is 2.15 to 2.25 inches; and wherein the overall configuration of the pointing device supports a hand plane of a user's right hand or left hand, the hand plane being a region defined by the second to fifth metacarpals, the metacarpals being numbered 1-5, beginning with the thumb, a size of the user's hand filling within a range of a 5th percentile female to a 95th percentile male of North American adults, while allowing fingers of the user's right hand or left hand to rest in a neutral posture to reach and activate the keys, a lower palm of the user's right hand or left hand may be positioned on a work surface and a thumb of the user's right hand or left hand is fully supported by a side of the housing such that the user may move and operate the pointing device while keeping the hand in a biomechanically neutral position, the pointing device allows a user to grasp it in a variety of ways, depending on the physical size of the user's hand, and the pointing device may be accurately moved and operated while providing a sense of control and responsiveness to the user.

15. The pointing device according to claim 14 wherein the length of the pointing device is 4.5 inches, the high point is 1,587 inches from the bottom surface, the high point is 2.75 inches from the front edge, the height of the back end is 0.5 inch, and the lateral pinch width is 2.25 inches.

16. A pointing device for inputting commands into a computer comprising:
   a body; and
   a key coupled to the body wherein the pointing device is provided with a smoothly sloping upper surface, the upper surface sloping upwards from a front end to a high point and sloping downwards from the high point to a back end, the upper surface having a sufficient width to support an index, middle and ring finger of either a right hand or left hand of a user in a biomechanically neutral position, a size of the user's hand falling within a range of a 5th percentile female to a 95th percentile male of North American adults, and wherein the pointing device is shaped to allow a wrist of the user to be in a biomechanically neutral position, while maintaining an ability to be moved and operated accurately by the user.

17. The pointing device according to claim 16 wherein the body further comprises a front end, a back end, and a top surface, the key being coupled to the body such that it forms a portion of the front end and of the top surface, the top surface sloping upwards from the front end to a high point, the top surface sloping downwards from the high point to the back end, the high point being positioned a selected distance from the front end such that it provides a support for the user's hand plane and allows a finger of the user to rest in a neutral posture along the top surface of the pointing device such that the key may be activated by the fingers of the user, and wherein the sloping top surface and high point allow the user to grasp the pointing device in a neutral position.

18. The pointing device according to claim 17 wherein the distance from the high point to the front end of the pointing device is 2.65 to 2.75 inches.

19. The pointing device according to claim 17, further comprising:
   a bottom surface for resting on a work surface, wherein a distance between the high point and the bottom surface measured along a line perpendicular to the bottom surface is 1.5 to 1.6 inches; and
   wherein the top surface slopes gradually upward from the back end to the high point such that the pointing device supports the weight of the hand of the user when it is placed on the pointing device, while allowing the hand to remain in a neutral position.

20. The pointing device according to claim 19 further including means for communicating with a computer, the means for communicating including a rotatable ball, located in the bottom surface near the front end of the pointing device, such that the center of the rotatable ball is near a grip axis to provide the user with a feeling of responsiveness and control when positioning the pointing device.

21. The pointing device according to claim 17, further comprising:
   a bottom surface for resting on a work surface;
   a front edge where the front end and top surface meet;
   a back edge where the back end and the top surface meet; and
   wherein a height of the back end measured from a center point of the back edge to the bottom surface is a selected distance whereby the user may position a lower palm on the work surface such that the hand plane and fingers rest on the pointing device in the neutral position, thereby increasing the accuracy with which the pointing device may be positioned and activated and thereby minimizing the static loading on the user's forearm muscles and other large muscle groups.

22. The pointing device according to claim 21 wherein the distance between the back edge and the bottom surface is 0.0 to 0.5 inch.

23. The pointing device according to claim 21 wherein a length of the product measured along the bottom surface is a selected distance such that the user may to grasp and rest the hand controlling the pointing device in a neutral position, wherein extension of the wrist, and ulnar and radial deviation of the wrist, are minimized.

24. The pointing device according to claim 23 wherein the length of the pointing device is 4.25 to 4.5 inches.

25. The pointing device according to claim 17 wherein an area of the user's hand that may be in primary contact with the pointing device is a metacarpal-phalangeal joint-ridge and a width of the pointing device, measured along an arc of the top surface corresponding to a typical placement of the metacarpal-phalangeal joint-ridge is a selected distance, so as to fully support the critical area of the user's hand.

26. The pointing device according to claim 25 wherein the width of the pointing device is at least 2.7 inches.

27. The pointing device according to claim 17 wherein an edge, defined by the perimeter of the top surface, is curved to eliminate contact between the user's hand and a sharp edge, thereby allowing the user to grasp the pointing device in a variety of ways.

28. The pointing device according to claim 17 wherein the key has a minimum width and length such that the user can reach and activate the key with an index finger while maintaining the fingers in a neutral posture, and the pointing device has a minimum height in a region on a side of it such that a thumb of a user may rest in a fully supported position against the side of the pointing device.

29. The pointing device according to claim 28 wherein the key is at least 0.7 inch wide and 1.0 inch long and the height of the pointing device in the region on the side of the pointing device is at least 0.9 inch.

30. The pointing device according to claim 28 wherein the key is provided with a raised element made of a resilient material to allow the user to know the key is being touched without having to look at the pointing device.

31. The pointing device according to claim 30 wherein the key is provided with a ridge made of a resilient material.

32. A pointing device for inputting commands into a computer comprising:
a body; and
a key coupled to the body wherein the pointing device is provided with a sloping upper surface, the upper surface sloping upwards from a front end to a high point and sloping downwards from the high point to a back end, the upper surface having a sufficient width such that the high point and surrounding curvature of the top surface supports a metacarpal-phalangeal joint ridge of a user's right hand or left hand, a size of the user's hand falling within a range of a 5th percentile female to a 95th percentile male of North American adults, a back end of the pointing device having a sufficiently low height such that the user may position a lower palm of the user's right hand or left hand on a work surface, and a width of a front end of the pointing device is dimensioned such that the user may grasp the pointing device in a biomechanically neutral position, while maintaining an ability to move and operate the pointing device with precision.

* * * * *

UNITED STATES PATENT AND TRADEMARK OFFICE
CERTIFICATE OF CORRECTION

PATENT NO. : 5,414,445
DATED : May 9, 1995
INVENTOR(S) : Steven T. Kaneko and Aditha M. Adams It is certified that error appears in the above-indentified patent and that said Letters Patent is hereby corrected as shown below:

In column 8, claim 14, line 50, please delete ":" and insert therefor --;--.

In column 8, claim 14, line 54, please delete ":" and insert therefor --;--.

In column 8, claim 14, line 56, please delete ":" and insert therefor --;--.

In column 9, claim 15, line 22, please delete "1,587" and insert therefor --1.587--.

Signed and Sealed this

Fourteenth Day of November, 1995

Attest:

BRUCE LEHMAN

Attesting Officer *Commissioner of Patents and Trademarks*